June 1, 1965  C. F. REBHUN  3,186,510
DEVICE FOR INDICATING CONSUMPTION OF CONSUMABLE ELECTRODES
Filed March 23, 1964
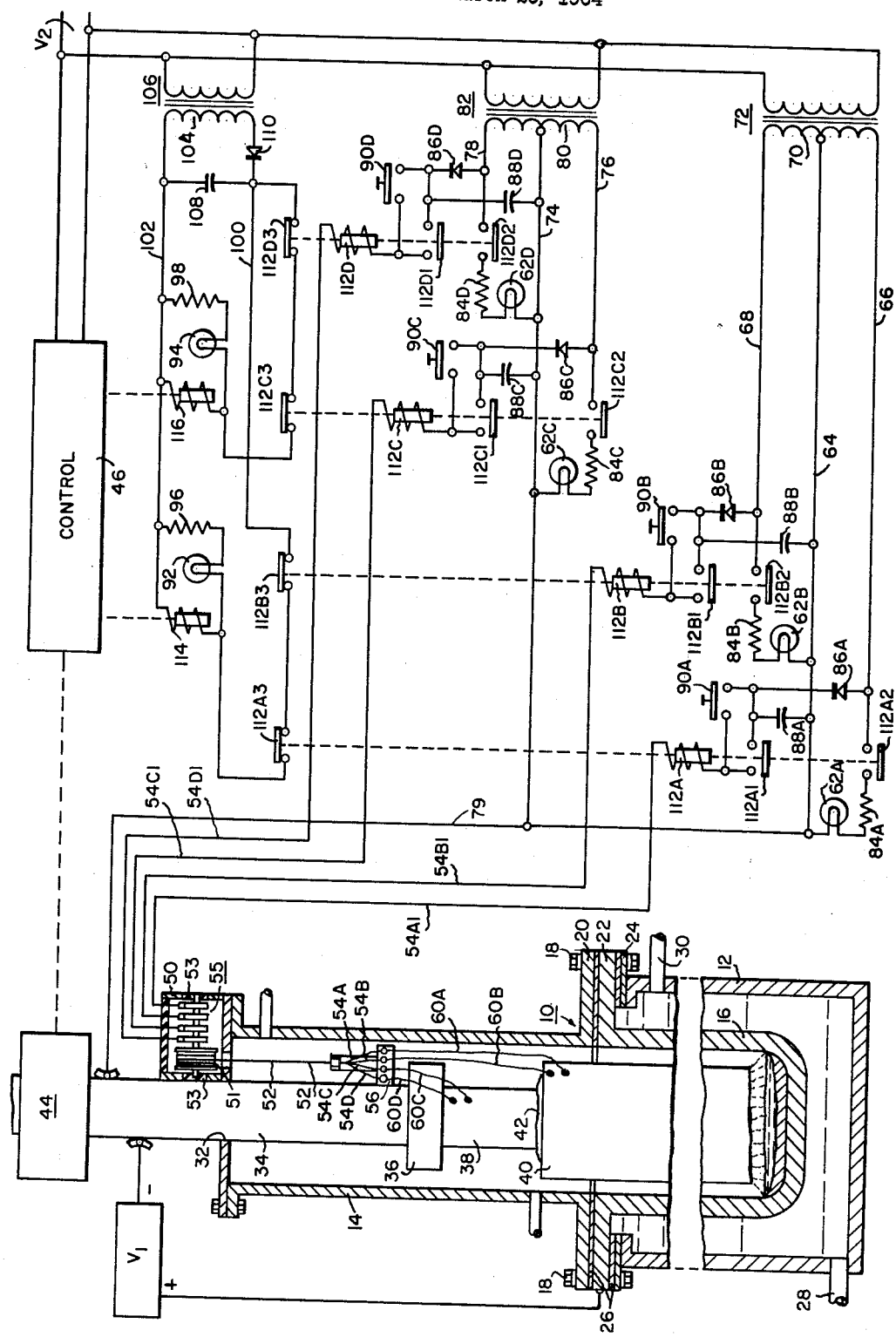

3,186,510
DEVICE FOR INDICATING CONSUMPTION OF CONSUMABLE ELECTRODES
Charles F. Rebhun, Natrona Heights, Pa., assignor to Allegheny Ludlum Steel Corporation, Brackenridge, Pa., a corporation of Pennsylvania
Filed Mar. 23, 1964, Ser. No. 353,794
10 Claims. (Cl. 13—9)

This invention relates generally to consumable electrode melting, and more particularly to a method and device for providing a signal when various conditions occur during consumable electrode melting. In even more particular aspects, this invention concerns a method and device for providing a signal when the melting of the consumable electrode has progressed to each of several selected stations, or when certain failures occur in the melting of the electrode.

In consumable electrode melting furnaces, an elongated electrode is formed of the metal to be melted and arc is struck and maintained between the end of the electrode and a crucible or metal contained therein and in which the melted metal is collected and solidifies. The electrode is attached by a clamp to equipment which will adjust the electrode height to maintain the proper arc length. The electrode is normally formed with a smaller diameter stub cast on or welded to one end of the main body of the electrode. The stub is secured by a clamp to an electrode ram disposed to be driven to lower the electrode. When the melting of the main body of the electrode has progressed to the region adjacent the stub, the operator commences a procedure known as hot topping. In this procedure the melting rate is changed by changing the current and/or speed of movement of the ram. The melting then progresses preferably to as close to the clamp as possible in order to obtain maximum yield, but not so close as to damage the clamp by heat or actual melting. With most furnaces it is difficult to ascertain by observation exactly when the melting has reached the area adjacent the stub where hot topping should begin, and also it is difficult to ascertain when the melting is approaching the clamp closely enough to endanger it. Mechanical devices developed for this purpose have proved more or less unsatisfactory in providing this information.

It is therefore a principal object of this invention to provide discernible signals when given conditions occur during consumable electrode melting.

A more specific object of this invention is the provision of discernible signals when the melting of a consumable electrode has progressed certain predetermined amounts.

An even more specific object of this invention is to provide discernible signals during melting of consumable electrodes when the melting of the main body of the electrode has been completed, and also when the melting of the stub is approaching the clamp.

Still a further, more general object of this invention is the provision of a device for attachment to an electrode to be consumably melted, which device will provide signals at selected melting conditions.

Where the stub is welded onto instead of being cast integrally with the main body of the electrode, if the welding is improperly performed the welded region may become weak and susceptible to cracking. If, during operation this region should crack, as does happen on occasion, the alignment of the electrode is altered, which will tend to cause arcing between the side of the crucible and the electrode, resulting in damage to the crucible and in improperly melted material. Such a condition in some instances may not be quickly detected with conventional equipment.

It is therefore a further object of this invention to provide a signal during consumable electrode melting when a substantial misalignment of the electrode occurs.

A more limited object of this invention is the provision of a device for attachment to an electrode during consumable melting which will provide a signal if a fracture resulting from misalignment occurs.

These and other objects, together with a fuller understanding of the invention, will become apparent from the following description, when taken in conjunction with the accompanying drawing in which:

The single figure is a side elevational view, somewhat schematic and partially in section, of a consumable electrode melting furnace embodying the signalling device of this invention.

Referring now to the drawing, the signalling device of this invention is embodied in a consumable electrode melting furnace of any suitable design and which may comprise a furnace housing 10 which has a lower shell 12 and an upper shell 14. A crucible 16 is disposed in the lower shell 12 and is secured to the housing by means of bolts 18 which extend through flanged portions 20, 22 and 24 of the upper shell, crucible and lower shell, respectively. The crucible is insulated from the housing by annular rings 26 of electrical insulation through which the bolts 18 also extend. The lower shell 12 serves as a water jacket for maintaining cooling water in the space between the crucible 16 and the lower shell 12. A suitable water inlet 28 and outlet 30 are provided.

The upper shell 14 of the housing 10 has a top aperture 32 provided with any suitable sealing means (not shown) and through which a ram 34 is slidably disposed in sealed relation therein. The ram 34 is provided with a clamp 36 at the end thereof which clamps the stub end 38 of the electrode to be consumably melted. In this instance, the stub end 38 of the electrode is welded to the main body 40 of the electrode as shown at 42. The current is provided to the electrode from an external electrical source marked generally as $V_1$, with the ram and electrode being maintained negative and the crucible being maintained positive. A drive mechanism represented by the block 44 is provided externally of the furnace disposed to be operated in response to a suitable control system, represented by the block 46, to move the electrode vertically within the housing. The drive mechanism raises and lowers the electrode to maintain the proper positioning of the electrode relative to the molten metal in the crucible for effecting an efficient melting operation, the result of which is a general controlled lowering of the electrode as the melting progresses.

The signalling device of this invention includes a reel housing 50 which communicates with and is secured to the upper furnace shell 14. The reel housing 50 has disposed therein a spring biased reel 51 electrically insulated from the housing by insulation 53 and on which a four-strand cable 52 is spooled. The four strands of cable are designated by the reference characters 54A, 54B, 54C and 54D, and are insulated by woven asbestos or glass fibre against both electricity and heat. A terminal block 56 is secured to the ram 34 and is provided with four junctions (unnumbered) to which the strands 54A, 54B, 54C and 54D are connected, respectively. Extending from each of the junctions are signal wires 60A, 60B, 60C and 60D, respectively. The ends of wires 60A and 60B are welded to the main body 40 of the electrode adjacent the weld 42, and the ends of the wires 60C and 60D are welded to the stub end 38 of the electrode adjacent the clamp 36. The upper ends of the strands 54A, 54B, 54C and 54D are electrically connected, for example, as through a four-section commutator 55, and by conductors 54A1, 54B1, 54C1 and 54D1, respectively, to a circuit for providing the signals during the various operating conditions as will be explained hereafter. The signalling circuit includes signal lamps 62A, 62B, 62C and 62D which are responsive, respectively, to signals controlled by the condition of signal wires 60A, 60B, 60C and 60D. Signal lamp 62A is disposed to be connected between conductors 64 and 66, and signal lamp 62B is disposed to be connected between conductors 64 and 68. Conductors 64, 66 and 68 are connected to secondary coil 70 of transformer 72. The signal lamp 62C is disposed to be connected between conductors 74 and 76, and signal lamp 62D is disposed to be connected between conductors 74 and 78. The conductors 74, 76, and 78 are connected to secondary coil 80 of transformer 82. Conductors 64 and 74 are connected as by conductor 79 to a contact member on the ram 34. The signal lamps 62A, 62B, 62C and 62D are connected in series with current-limiting resistors 84A, 84B, 84C and 84D, respectively. Rectifiers 86A, 86B, 86C and 86D are connected to conductors 66, 68, 76 and 78, respectively. Capacitor 88A is connected between conductor 64 and rectifier 86A, capacitor 88B is connected between conductor 64 and rectifier 86B, capacitor 88C is connected between conductor 74 and rectifier 86C, and capacitor 88D is connected between conductor 74 and rectifier 86D. Normally open manually operated switches 90A, 90B, 90C and 90D are disposed to be operated to connect the energizing windings of relays 112A, 112B, 112C and 112D, respectively, to rectifiers 86A, 86B, 86C, and 86D, respectively. Two additional signal lamps 92 and 94 are disposed to be connected through resistors 96 and 98, respectively, between conductors 100 and 102. The conductors 100 and 102 are connected to the secondary coil 104 of transformer 106. A capacitor 108 is connected between the conductors 100 and 102, and a rectifier 110 is provided in conductor 100. The other end of the energizing windings of relays 112A, 112B, 112C and 112D are connected to conductors 54A1, 54B1, 54C1 and 54D1, respectively. When energized, relay 112A operates normally open relay contact 112A1 to establish a holding circuit for relay 112A. Also, when energized, relay 112A closes normally open relay contact 112A2 to connect conductor 66 and resistor 84A, and opens normally closed relay contact 112A3 to interrupt the energizing circuit for signal lamp 92. When energized, relay 112B operates normally open relay contact 112B1 to establish a holding circuit for relay 112B. Also, when energized, relay 112B closes normally open relay contact 112B2 to connect resistor 84B and conductor 68, and opens normally closed relay contact 112B3 to interrupt the energizing circuit for lamp 92. When energized, relay 112C operates normally open relay contact 112C1 to establish a holding circuit for relay 112C. Also, when energized, relay 112C closes normally open relay contact 112C2 to connect resistor 84C and conductor 76, and opens normally closed relay contact 112C3 to interrupt the energizing circuit for lamp 94. When energized, relay 112D operates normally open relay contact 112D1 to establish a holding circuit for relay 112D. Also, when energized, relay 112D closes normally open relay contact 112D2 to connect resistor 84D to conductor 78, and opens normally closed relay contact 112D3 to interrupt the energizing circuit for lamp 94.

The energizing windings of relay 114 are connected in parallel with signal lamp 92, and in series with normally closed relay contacts 112A3 and 112B3, and the energizing windings of relay 116 are connected in parallel with lamp 94 and in series with normally closed relay contacts 112C3 and 112D3. Relays 114 and 116 are provided with at least one contact member each (not shown), which contact members are disposed for operation to control the connection of the automatic control 46 of the drive mechanism 44. The primary windings of transformers 72, 82 and 106 are connected to any suitable external voltage source $V_2$.

Operation

The stub of the electrode is secured in the clamp 36, and the ends of signal wires 60A and 60B are connected so as to be generally vertically spaced just below the weld 42, and the ends of wires 60C and 60D are connected so as to be vertically spaced just below the clamp 36. The melting of the electrode is commenced by impressing the voltage across the electrode and the crucible 16, which will cause an arc between the crucible and the electrode, causing melting of the electrode; normally the electrode will be maintained negative and the crucible maintained positive. The drive mechanism 44 adjusts the positioning of the electrode to establish a desired arc length as described, and after melting has commenced the voltage impressed on the electrode through the clamps 36 and ram 34 will be carried as a signal through wires 60A, 60B, 60C and 60D and terminal block 56, and thence through wires 54A, 54B, 54C and 54D, respectively, the four-section commutator 55 and conductors 54A1, 54B1, 54C1 and 54D1, respectively, to the energizing windings of relays 112A, 112B, 112C and 112D, respectively.

A negative voltage is impressed from the ram 34 through conductor 79 to wires 64 and 74. Switches 90A, 90B, 90C and 90D are then operated manually to closed positions to connect the energizing windings of relays 112A, 112B, 112C and 112D to the energizing source to effect an operation thereof. When thus energized, relay 112A operates contact member 112A1 to establish the holding circuit described, after which switch 90A is opened, operates contact member 112A2 to establish the energizing circuit for signal lamp 62A, and operates contact member 112A3 to interrupt the energizing circuit for relay 114 and signal lamp 92. When signal lamp 62A is lighted, it indicates wire 60A is connected between the electrode 40 and terminal 56. Similarly, when relay 112B is energized, it operates contact member 112B1 to establish the holding circuit described for relay 112B, and switch 90B can then be opened, operates contact member 112B2 to establish the energizing circuit for signal lamp 62B, and operates contact member 112B3 to interrupt the energizing circuit for relay 114 and signal lamp 92. The lighting of lamp 62B indicates wire 60B is connected between the electrode 40 and terminal 56. When relay 112C is energized, contact member 112C1 establishes the holding circuit for relay 112C and switch 90C is moved to its normally opened position, contact member 112C2 establishes the energizing circuit for lamp 62C and contact member 112C3 interrupts the energizing circuit for relay 116 and lamp 94. The lighting of lamp 62C indicates wire 60C is connected between the stub 38 and the terminal 56. Likewise, relay 112D, when energized, moves contact member 112D1 to establish the holding circuit for relay 112D, after which switch 90D is manually opened, contact member 112D2 to establish the energizing circuit for lamp 62D, and contact member 112D3 to interrupt the energizing circuit for relay 116 and lamp 94. When lighted, lamp 62D indicates that wire 60D is connected between the stub 38 and the terminal 56. Thus, during melting of the electrode, lamps 62A, 62B, 62C and 62D will normally glow, while lamps 92 and 94 will not glow. When the melting progresses to the point where the connection between wire 60A and the main body of the electrode is melted, the energizing circuit for relay 112A will be interrupted and relay contacts 112A1 and 112A2 will be moved to their circuit-interrupting positions and contact 112A3 to a circuit-establishing position. The opening of contact 112A2 will interrupt the energizing circuit for lamp 62A which then ceases to be lighted. This will indicate to the operator that the melting has progressed to the point of contact of the wire 60A on the electrode. As the melting continues, the connection of wire 60B to the electrode will also be melted to interrupt the energizing circuit of relay 112B, and contacts 112B1 and 112B2 will be opened thus deenergizing lamp 62B, causing it to go out, and contact 112B3 will be closed.

As lamp 62A goes out, this is a visual indication to the operator that melting is rapidly approaching the point where hot topping should begin. When both lamps 62A and 62B have gone out, the operator knows it is time to start the procedure of hot topping (that is, reduce the rate of melting), since the melting has proceeded close to the vicinity of the weld 42. Further, the closing of both contacts 112A3 and 112B3 completes the circuit for lamp 92, causing lamp 92 to flow and give a positive visual signal to the operator, and this lamp is preferably of a distinctive color such as blue or red which will immediately draw the operator's attention, as opposed to the extinguishing of the two lamps 62A and 62B, so that he can manually initiate a change in the operation of the control 46. However, as shown, the closing of contacts 112A3 and 112B3 will energize relay 114, and by suitably connecting relay 114 to the control 46, the controls may be programmed to automatically start hot topping. One skilled in the art will recognize how such programming can be accomplished. As hot topping is continued, either manually or through the automatic controls, and melting of the stub 38 is progressively continued to the connection of wire 60C, the connection of wire 60C is melted. The melting of such connection interrupts the energizing circuit for relay 112C, which is then operated to close contact 112C3 and open contacts 112C1 and 112C2, thus causing lamp 60C to be extinguished, indicating to the operator that the hot topping is nearly completed. As the melting continues, the connection of the wire 60D with the electrode stub is melted and the energizing circuit for relay 112D is interrupted, causing contact 112D3 to close and contacts 112D1 and 112D2 to open and lamp 60D to be extinguished, which indicates to the operator that the hot topping has been completed and that further melting will damage the clamp. Since contact 112C3 has been previously closed, the closing of contact 112D3 establishes the energizing circuit for relay 116 and lamp 94, causing it to glow. Lamp 94 is also of a contrasting color such as red or blue, and preferably different from lamp 92; this lamp provides an additional positive signal to the operator that hot topping has been completed and that melting should cease to prevent damage to the clamp 36. The operator can manually initiate a change in the operation of control 46 to retract the ram and interrupt the arc, or, as in the case illustrated, the relay 116 will be operated to effect an automatic change in control 46 to stop the melting operation. One skilled in the art will recognize how such connections can be made.

The wires are used in pairs, i.e., wires 60A and 60B as one pair and wires 60C and 60D as another pair, as a safety or check feature, with the wires being connected at predetermined positions vertically along the electrode and stub as illustrated so that if there is a malfunction in either of the wires or its associated circuit, the other wire will continue to give a proper indication of the condition.

Also, another benefit that can be derived from this system is an indication of a failure of the weld 42. For such an indication it is necessary that the wires 60A and 60B be reasonably free of slack. If the weld 42 should fail and the electrode should start to twist or pull down from the stub, the connection of the wires 60A and 60B to the electrode would immediately be broken, which would cause lamps 62A and 62B to go out, and lamp 92 to glow. This would be an immediate indication to the operator that there is a malfunction and that he should take immediate steps to stop the melting and retract the ram and electrode carried thereby. If such an indication were not given and the melting stopped, considerable damage to the crucible and melt would result.

Although an embodiment of this invention has been shown and described, various adaptations and modifications may be made therein without departing from the scope and appended claims.

I claim:

1. In a consumable electrode melting furnace having an enclosed melting chamber, ram means to advance the electrode being melted downwardly, and clamp means to secure the electrode to the ram means, the improvement which comprises, an electrical circuit disposed externally of said furnace, said circuit having first and second portions each including signalling means having a first condition when the respective portion is energized responsive to an electric signal and a second condition when no signal is received, first and second current-conducting wire means each having a first end connected, respectively, to the first and second portions of said circuit and a second end connectable to said electrode at spaced selectable locations, each of said wire means having a supply length thereof disposed to extend as the ram moves the electrode downwardly, and a source of electricity to provide a flow of signal current through said electrode and each of said first and second wire means to said first and second portions, respectively, of said electrical circuit when said wire means is connected to said electrode, whereby when the electrode is melted in the region of the connections of said first and second wire means the connections will be broken and the signal removed from the respective portions of said electrical circuit, thereby causing the second condition of the signalling means to occur in each portion of the circuit when its respective signal is removed.

2. The combination of claim 1 further characterized by second signalling means and means connected to said first and second portions of said circuit to operate said second signalling means, whereby additional discernible signals are provided when said electrical signals are removed from the portions of said circuit.

3. In a consumable electrode melting furnace having an enclosed melting chamber, ram means to advance the electrode being melted downwardly, and clamp means to secure the electrode to the ram means, the improvement which comprises, an electrical circuit disposed externally of said furnace, said circuit having a first and second portion each including a signal lamp adapted to glow when its respective portion is energized responsive to an electric signal, first and second current-conducting wire means each having a first end connected respectively to the first and second portions of said circuit and a second end connectable to said electrode at spaced selectable locations, each of said wire means having a supply length thereof disposed to extend as the ram moves the electrode downwardly, and a source of electricity to provide a flow of signal current through said electrode and each of said wire means to said electrical circuit when said wire means is connected to said electrode, whereby when the electrode is melted in the region of each connection of the wire means, the connection will be broken and the signal removed from the respective portion of the circuit, thereby causing the respective signal light to be extinguished.

4. In a consumable electrode melting furnace having an enclosed melting chamber, ram means to advance the electrode being melted downwardly, and clamp means to secure the electrode to the ram means, the improvement which comprises, an electrical circuit disposed externally of said furnace, said circuit having first and second portions each including signalling means having a first condition when the respective portion is energized responsive to an electric signal and a second condition when no signal is received, first and second current-conducting wire means each having a first end connected respectively to the first and second portions of said circuit and a second end connectable to said electrode at spaced selectable locations, reel means mounted on said furnace having a supply length of said wire means spooled thereon and adapted to supply the required length of wire as the electrode is moved downwardly, and a source of electricity to supply a flow of signal current through said electrode and each of said wire means to said electrical circuit when said wire means is connected to said circuit, whereby when the electrode is melted in the region of each wire means the connection will be broken and the signal removed from the respective portion of the circuit, thereby causing the second condition of the signal means to occur in each portion of the circuit when its respective signal is removed.

5. The combination of claim 4 wherein each of said signalling means includes a lamp adapted to glow when a signal is received in its respective portion of the circuit.

6. The combination of claim 5 further characterized by second signalling means and means connected to said first and second portions of said circuit to operate said second signalling means whereby additional discernible signals are provided when said electrical signals are removed from the portions of said circuit.

7. In a consumable electrode melting furnace having an enclosed melting chamber, ram means to advance the electrode being melted downwardly and clamp means to secure the electrode to the ram means, the improvement which comprises, an electrical circuit disposed externally of said furnace, said circuit having first and second portions each including signalling means having a first condition when the respective portion is energized responsive to an electric signal and a second condition when no signal is received, a terminal block mounted on said ram means and having a pair of electrical connections, a first pair of wires each having one end connected to one of said electrical connections on said terminal block and the other end connected to one of said portions of said circuit, said first pair of wires having a supply length disposed to extend as the ram moves the electrode downwardly, a second pair of wires each having one end connected to each of said spaced connections of said terminal block and the other ends being connectable to said electrode at spaced locations thereon, a source of electricity to provide a flow of current through said electrode and said wires to said circuit when the wire means are connected to the electrode, whereby when the electrode is melted in the region of the connection of each of the wire means to the electrode, the connection will be broken and the signal removed from the respective portion of the circuit, thereby causing the second condition of the signalling means to occur in each portion of the circuit when its respective signal is removed.

8. The combination of claim 7 wherein said signalling means includes lamps adapted to glow when energized by a current in its respective portion of the circuit.

9. The combination of claim 8 wherein the supply length of said wire is carried on a reel mounted on the furnace.

10. The combination of claim 9 further characterized by second signalling means and means connected to said first and second portions of said circuit to operate said second signalling means, whereby additional discernible signals are provided when said electrical signals are removed from the portions of said circuit.

References Cited by the Examiner
UNITED STATES PATENTS

| | | | |
|---|---|---|---|
| 218,375 | 8/79 | Fuller | 314—10 |
| 501,081 | 7/93 | Kirkegaard | 314—10 |
| 2,762,856 | 9/56 | Newcomb et al. | 13—9 |

RICHARD M. WOOD, *Primary Examiner.*

JOSEPH V. TRUHE, *Examiner.*